United States Patent [19]

Bonomo

[11] 3,953,075
[45] Apr. 27, 1976

[54] AUXILIARY WHEEL MOUNTING
[76] Inventor: Richard S. Bonomo, P.O. Box 453, Delavan, Ill. 61734
[22] Filed: Sept. 3, 1974
[21] Appl. No.: 502,535

Related U.S. Application Data
[63] Continuation of Ser. No. 299,141, Oct. 19, 1972, abandoned.

[52] U.S. Cl............................ 301/40 S; 301/38 R; 301/36 R; 301/9 R
[51] Int. Cl.².......................................... B60B 11/00
[58] Field of Search............. 301/36 R, 39 R, 39 C, 301/39 ST, 38 R, 41, 43, 47, 13 R, 13 SM, 40 R, 40 S, 9 R

[56] References Cited
UNITED STATES PATENTS
1,948,136  2/1934  Scheckler ............................ 301/38
2,416,862  3/1947  Baker................................. 301/13 R Primary Examiner—Robert B. Reeves
Assistant Examiner—D. W. Keen
Attorney, Agent, or Firm—Wegner, Stellman, McCord, Wiles & Wood

[57] ABSTRACT

A mounting for auxiliary wheel of a vehicle in which the auxiliary rim has an annular mounting ring secured thereto, the ring having an inturned flange at one edge which is bolted to the regular wheel. In the preferred embodiment an extension ring on the regular wheel has a flange lying in the plane of the side wall of the tire. Similarly the flange on the auxiliary wheel mounting ring lies in the plane of the side wall of the auxiliary tire so that the side walls and flanges are substantially coplanar. A spacer secured to the other edge of the mounting ring provides support for an additional auxiliary wheel.

8 Claims, 6 Drawing Figures

AUXILIARY WHEEL MOUNTING

This is a continuation of application Ser. No. 299,141 filed Oct. 19, 1972, now abandoned.

This invention is concerned with an auxiliary wheel mounting for a vehicle.

An auxiliary wheel mounting permits the addition of a wheel to a vehicle, adjacent the regular wheel. Such a mounting is used, for example, with a tractor having single drive wheels, which is to be operated under conditions in which greater support is needed, as in soft or marshy ground.

Prior auxiliary wheel mountings have required specially formed connector rings, clamps and fittings. Examples are found in Brink U.S. Pat. No. 2,874,997, DeGerness U.S. Pat. No. 3,082,040, Olsen U.S. Pat. No. 3,328,088, Peterson U.S. Pat. No. 3,337,270 and Unverferth U.S. Pat. Nos. 3,532,383 and 3,583,767, and in my prior applications, Ser. No. 855,494, filed Sept. 5, 1969, and Ser. No. 226,781, filed Feb. 16, 1972, for example.

A major field in which auxiliary wheels are used is for the drive wheels of farm tractors. The single wheels which are standard with most farm tractors are satisfactory and sufficient under many conditions of operation. Where, however, the tractor is to operate in marshy terrain, a second set of drive wheels is desirable to distribute the load and reduce the likelihood of the tractor becoming mired. Most farm tractors have a standard wheel size and mounting bolt placement. With this in mind, I have developed a mounting for an auxiliary wheel which does not use special fittings as required by some of the prior patents and which permits the auxiliary wheel to be mounted and removed with a minimum of effort.

One feature of the invention is that the auxiliary wheel structure includes a wheel rim, a mounting ring secured at one edge to the auxiliary wheel rim and extending generally parallel to the axis of the wheels toward the rim of the regular wheel with a radial flange extending inwardly toward the wheel axis at the other edge of the mounting ring and means to secure the flange of the mounting ring to the regular wheel.

A farm tractor wheel and tire may weigh several hundred pounds. It is difficult for one man to move an auxiliary wheel into alignment with the regular wheel as is necessary in order to fasten it in place. It is a feature of the preferred embodiment of the invention that an extension ring is connected with the regular wheel and has an outer edge with a flange which lies generally in the plane of the side wall of the regular wheel tire. The flange of the mounting ring of the auxiliary wheel similarly lies in the plane of the side wall of the auxiliary wheel tire. The flanges of the two rings are bolted together. As the flanges lie adjacent each other and are generally in the plane of the side walls of the tires manipulation of the auxiliary wheel to align the bolt holes is facilitated.

Still another feature of the invention is that the extension and mounting rings are provided with reinforcing fins on the inner ring surface which extend generally radially and axially of the ring.

A further feature of one form of the invention is that the ring is a flat plate formed into a circle and the flange or flanges thereon are provided by an angle member formed into a circle and secured to the edge of the plate.

Yet another feature is that a second auxiliary wheel may be mounted outwardly of the first auxiliary wheel.

Further features and advantages of the invention will readily be apparent from the following specification and from the drawings, in which.

Figure 1:
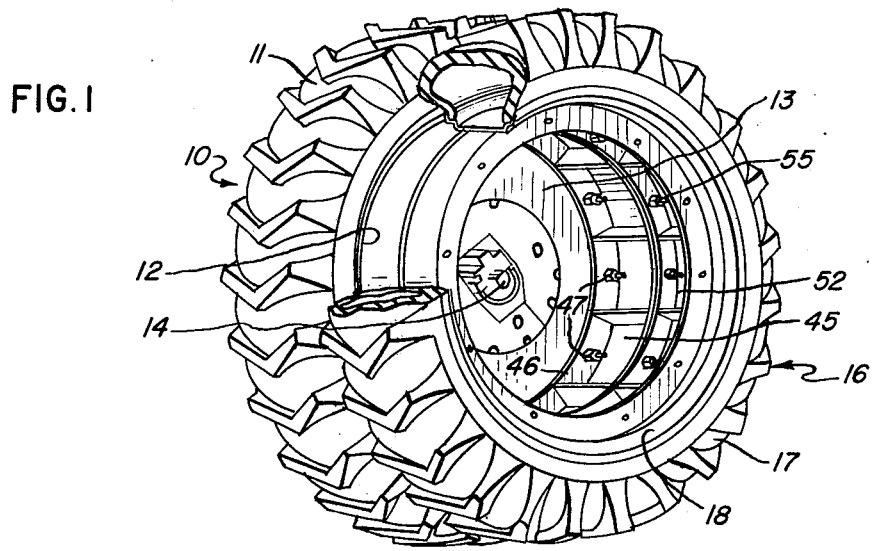
FIG. 1 is a broken perspective illustrating an auxiliary wheel secured to the regular wheel of a vehicle.

In FIG. 1 the inner regular wheel 10, as of a tractor, has a tire 11 mounted on a rim 12 in turn secured to a carrier or spider 13 supported from an axle 14. An outer auxiliary wheel 16 has a tire 17 mounted on a rim 18. The auxiliary wheel 16 is secured to the regular wheel 10 by one or more rings, as will appear.

Figure 2:
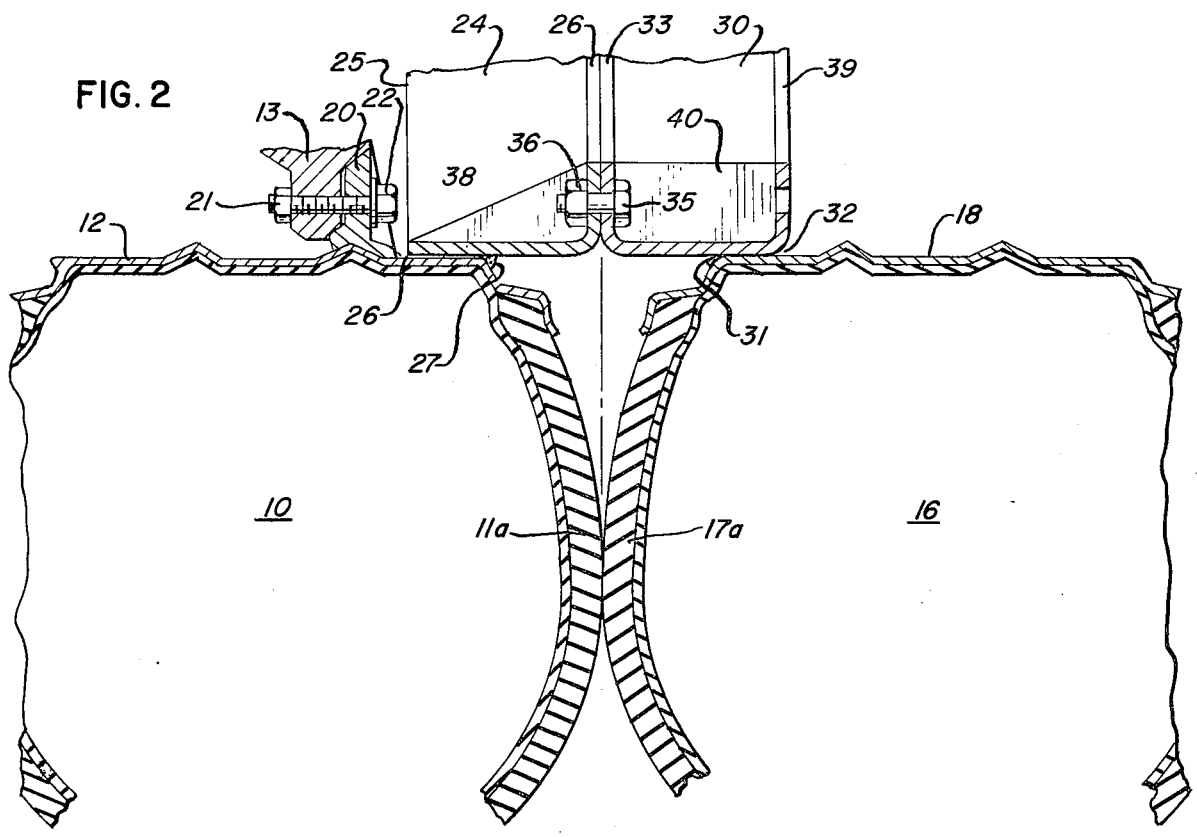
FIG. 2 is a fragmentary sectional view of a preferred embodiment of the invention.

Turning to the preferred embodiment of FIG. 2 of the drawings, rim 12 of regular wheel is provided with a mounting bracket 20 secured to the carrier 13 by a bolt 21 and wheel lug 22. It will be noted that the convex side wall 11a of the tire extends outwardly beyond the edge of rim 12, in a direction axial of the wheel. An extension ring 24 has its inner edge 25 secured to regular wheel rim 12 as by welds 26, 27. The outer edge of extension ring 24 is an inwardly turned radial flange 26 lying generally in the plane of the outer extremity of the convex surface of tire sidewall 11a. Auxiliary wheel rim 18 has a mounting ring 30 with its outer edge secured thereto as by welds 31, 32. The mounting ring 30 extends inwardly and terminates in an inturned radial flange 33 which lies generally in the same plane as the inner extremity of the convex sidewall 17a of the auxiliary tire. With the regular and auxiliary wheels, 10, 16 in abutting coaxial relation, the flanges 26 and 33 of the extension and mounting rings 24, 30 are adjacent each other and are secured together at a plurality of points around their annular extent, as by bolt 35 and nut 36.

The construction of FIG. 2 is particularly intended for an auxiliary wheel mount where the wheel is so large and heavy as to make its manipulation by one man difficult. With a farm tractor, for example, the tire is commonly 4 or 5 feet in diameter and is often filled with a liquid to increase its weight, improving traction. A rim and tire may weigh 400 or 500 pounds and cannot be picked up and moved about manually without mechanical assistance. The extension and mounting rings illustrated in FIG. 2 with abutting flanges lying generally in the plane of the adjacent sidewalls of the tires enable one man to mount the auxiliary wheel with a minimum of equipment and difficulty. A tire and wheel weighing several hundred pounds can be rolled by one man even though it cannot be picked up and moved from one place to another. With the illustrated construction, the auxiliary wheel can be rolled alongside the regular wheel without requiring lateral movement as the tire sidewalls and the flanges of the rings are coplanar. Preferably, the tractor is lifted on a jack to remove the weight from the regular wheel so that it and the auxiliary wheel are coaxial. The auxiliary wheel is rolled alongside and manipulated to align the bolt holes in the ring flanges 26 and 33. Manipulation may, for example, be accomplished by rolling the auxiliary wheel in an irregular path or by forcing it into alignment with a pin inserted through the bolt holes. The auxiliary wheel is then bolted in place, the jack removed, and the tractor is ready for operation.

The rings 24 and 30 are preferably reinforced by a plurality of fins which are secured to the inner ring surface and extend radially and axially thereof. The fin 38 of extension ring 24 is triangular in shape and is welded to the ring and to flange 26. Mounting ring 30 has a flange 39 which extends radially inwardly at its outer edge for a purpose to be described below. Reinforcing fin 40 is rectangular in shape and is welded to the ring and to both flanges 33 and 39.

Figure 4:
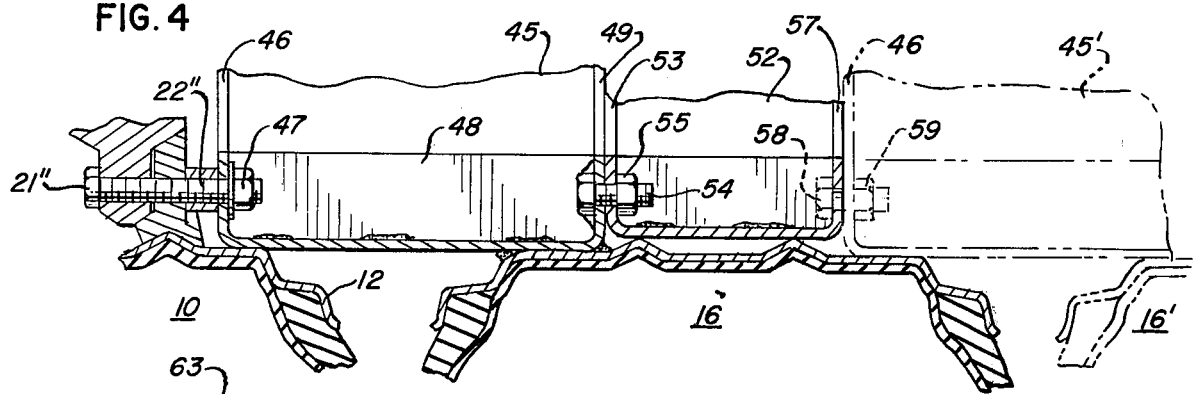
FIG. 4 is a fragmentary sectional view of another form of auxiliary wheel mounting embodying the invention.
Figure 3:
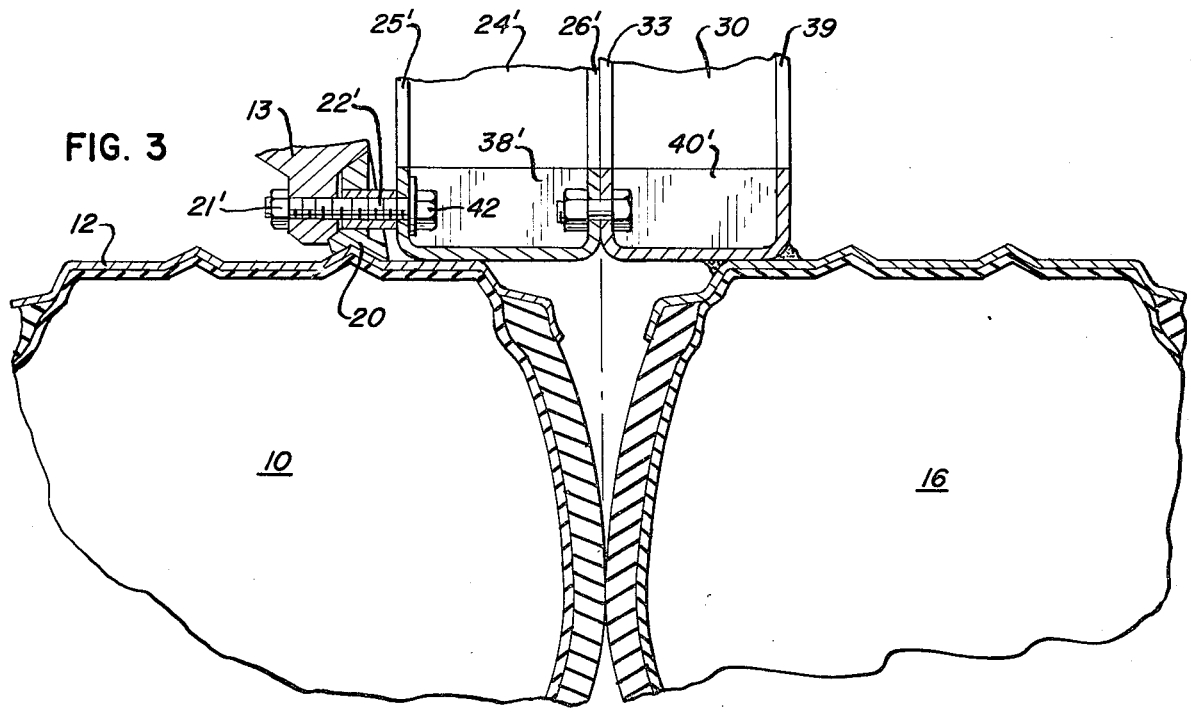
FIG. 3 is a fragmentary sectional view of a modification of FIG. 2.

FIG. 3 illustrates a modification of the mounting of FIG. 2 in which the extension ring 24' has a radially inturned flange 25' at its inner edge mounted on wheel bolts 21' by nuts 42. The inner flange 25' rests against wheel lugs 22'. This construction permits the mounting of the auxiliary wheel of FIG. 2 on the wheel of a tractor or other vehicle without the necessity of welding the extension ring 24 to the regular wheel rim. Reinforcing fin 38' is rectangular in shape and secured to the ring and both flanges 25', 26'.

Where the vehicle wheels are light enough to be manipulated more readily or, where equipment is available for lifting and moving the wheels transversely, as opposed to rolling them on the ground, the extension ring 24, 24' of FIGS. 2 and 3 can be eliminated. This illustrated in FIGS. 1 and 4. Referring particularly to FIG. 4, auxiliary wheel 16 has a mounting ring 45 secured thereto and extending axially inwardly, terminating in an inturned radial flange 46. The axial extent of ring 45 is such that it extends into the regular wheel rim 12 and holes in the flange 46 receive the ends of mounting bolts 21'' with the flange resting against wheel lugs 22''. The auxiliary wheel is secured in place by nuts 47. Mounting ring 45 is reinforced by fins 48 secured to the ring and to inner and outer flanges 46, 49.

An additional auxiliary wheel may be mounted outwardly of auxiliary wheel 16. A spacer ring 52, U-shaped in cross-section, has an inner flange 53 secured to the flange 49 of mounting ring 45 by bolts 54 and nuts 55. The additional auxiliary wheel 16', shown in broken lines, has a mounting ring 45' with an inturned radial flange 46' secured to the outer flange 57 of spacer ring 52 by bolts 58 and nuts 59.

Figure 5:
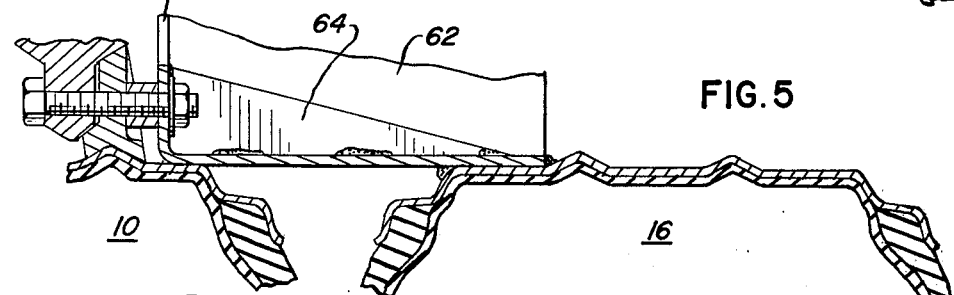
FIG. 5 is a fragmentary sectional view of a modification of FIG. 5.

If an additional auxiliary wheel is not to be required, the construction of FIG. 4 may be modified as illustrated in FIG. 5 whether the mounting ring 62 for auxiliary wheel 16 has a flange 63 only at its inner edge. Here, the reinforcing fin 64 is triangular.

Figure 6:
FIG. 6 is a sectional view of a further form of ring.

Equipment for forming a ring from an L-shaped or U-shaped channel, as is necessary in fabricating rings 24, 30, 45 and 52 is relatively expensive. FIG. 6 illustrates a simplified construction in which the ring 66 is formed of a flat plate and angle member 67 is formed into a circle and is secured to an edge of the plate.

I claim:

1. An auxiliary wheel and mounting for attachment to the regular wheel of a vehicle, in coaxial side-by-side relation to and for rotation with the regular wheel, the auxiliary wheel being on the outside and the regular wheel being on the inside with respect to the vehicle, the regular wheel having an axle, a wheel carrier supported from the axle, a wheel rim, means joining the wheel rim to the wheel carrier and a tire on the wheel rim, the regular wheel tire having a convex outer sidewall the outer extremity defining a plane spaced outwardly from the wheel rim and from the end of the axle, said auxiliary wheel and mounting comprising:
   an auxiliary wheel rim,
   an auxiliary tire on the auxiliary wheel rim, having a convex inner sidewall the inner extremity defining a plane spaced inwardly from the wheel rim,
   means secured to the auxiliary wheel rim having a mounting surface lying in the plane of the inner extremity of the inner sidewall of the auxiliary tire, and
   means on the regular wheel having a complementary surface lying substantially in the plane of the outer extremity of the outer sidewall of the regular tire on the regular wheel rim, to which complementary surface the mounting surface of the auxiliary wheel is secured.

2. The auxiliary wheel and mounting of claim 1 in which the means secured to the auxiliary wheel rim includes a mounting ring secured at one edge to the auxiliary wheel rim and extending gnerally parallel to the axis of the wheels toward the rim of the regular wheel, and the mounting surface is a flange lying in the plane of the inner extremity of the inner sidewall of the auxiliary tire.

3. The auxiliary wheel of claim 2 in which said mounting ring has a rectangular plate-like cross-section with an annular angle member secured to one edge thereof.

4. The auxiliary wheel and mounting of claim 1 in which the means on the regular wheel to which the auxiliary wheel is secured includes an extension ring secured to the regular wheel rim with an edge, and the complementary surface is a flange extending from the edge of said extension ring and lying generally in the plane of the outer extremity of the outer sidewall of the regular tire.

5. The auxiliary wheel and mounting of claim 4 in which said extension ring is secured to the mounting bolts of said regular wheel.

6. The auxiliary wheel and mounting of claim 5 in which said extension ring has a mounting flange at said one edge extending inwardly toward the wheel axis and having holes therein which receive said mounting bolts, and further including means against which the extension ring mounting flange seats for establishing the axial position of said extension ring with relation to the regular wheel rim so that the flange at the other edge of the extension ring lies generally in the plane of the outer extremity of the outer sidewall of the regular tire.

7. The auxiliary wheel of claim 4 in which the one edge of said extension ring is welded to said regular wheel rim.

8. The auxiliary wheel and mounting of claim 1 in which the means secured to the auxiliary wheel rim includes a mounting ring secured at one edge to the auxiliary wheel rim and extending generally parallel to the axis of the wheels toward the rim of the regular wheel, and the mounting surface is a flange extending inwardly toward the wheel axis at the other edge of said mounting ring and lying in the plane of the inner extremity of the inner sidewall of the auxiliary tire and in which the means on the regular wheel to which the auxiliary wheel is secured includes an extension ring secured to the regular wheel rim with an edge, and the complementary surface is a flange extending inwardly toward the wheel axis from the edge of said extension ring and lying generally in the plane of the outer extremity of the outer sidewall of the regular tire.

* * * * *